United States Patent
Theodosis et al.

(10) Patent No.: US 10,699,136 B2
(45) Date of Patent: Jun. 30, 2020

(54) SYSTEM AND METHOD FOR CAMERA-BASED DETECTION OF OBJECT HEIGHTS PROXIMATE TO A VEHICLE

(71) Applicant: Faraday&Future Inc., Gardena, CA (US)

(72) Inventors: Paul Alan Theodosis, Rancho Palos Verdes, CA (US); Oliver Max Jeromin, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 16/073,760

(22) PCT Filed: Jan. 25, 2017

(86) PCT No.: PCT/US2017/014973
§ 371 (c)(1),
(2) Date: Jul. 27, 2018

(87) PCT Pub. No.: WO2017/132278
PCT Pub. Date: Aug. 3, 2017

(65) Prior Publication Data
US 2019/0026572 A1    Jan. 24, 2019

Related U.S. Application Data

(60) Provisional application No. 62/288,999, filed on Jan. 29, 2016.

(51) Int. Cl.
*G06K 9/00*    (2006.01)

(52) U.S. Cl.
CPC ..... *G06K 9/00805* (2013.01); *G06K 9/00812* (2013.01)

(58) Field of Classification Search
CPC .. G06K 9/00812; G06K 9/00805; B60R 1/00; B60R 2300/303; G06T 1/0007; G06T 2207/10016; G06T 2207/30261; H04N 13/221
See application file for complete search history.

(56) References Cited

U.S. PATENT DOCUMENTS 6,535,114 B1 *  3/2003  Suzuki ............... G06T 7/20
                                                340/435
2008/0205706 A1  8/2008  Hongo
(Continued)

FOREIGN PATENT DOCUMENTS

WO    2015177648 A1    11/2015

OTHER PUBLICATIONS

International Search Report dated May 8, 2017 for International Application No. PCT/US2017/014973.

*Primary Examiner* — Hongmin Fan

(57) ABSTRACT

The present invention is generally directed to optical data processing or objects in proximity to an optical sensor or camera, such as a camera mounted on a vehicles. Image data is received from a camera mounted on a vehicle, the image data indicative of a motion of the camera with respect to a detected object within a proximity of the camera or the vehicle on which the camera may be mounted. An optical flow of the object in the image data is determined, and a height of the object is determined based on the determined optical flow.

13 Claims, 3 Drawing Sheets

(56) References Cited

U.S. PATENT DOCUMENTS

| | | | |
|---|---|---|---|
| 2011/0169957 A1* | 7/2011 | Bartz | B60R 1/00 348/149 |
| 2014/0313339 A1 | 10/2014 | Diessner | |
| 2015/0086080 A1* | 3/2015 | Stein | G06K 9/00798 382/104 |
| 2015/0332114 A1* | 11/2015 | Springer | G06K 9/4604 348/148 |
| 2015/0336547 A1* | 11/2015 | Dagan | B60T 7/22 701/70 |
| 2016/0104047 A1* | 4/2016 | Sibiryakov | G06K 9/46 382/103 |

* cited by examiner

SYSTEM AND METHOD FOR CAMERA-BASED DETECTION OF OBJECT HEIGHTS PROXIMATE TO A VEHICLE

CROSS-REFERENCE TO RELATED APPLICATION

This application is a National Phase application under 35 U.S.C. § 371 of International Application No. PCT/US2017/014973, filed Jan. 25, 2017, which claims priority to U.S. Provisional Application No. 62/288,999, filed Jan. 29, 2016, The subject matter of each of the aforementioned applications is hereby incorporated by reference in its entirety for all purposes.

FIELD OF THE DISCLOSURE

This relates generally to camera-based object detection, and more particularly, to detecting object heights using one or more cameras on a vehicle.

BACKGROUND OF THE DISCLOSURE

Modern vehicles, especially automobiles, increasingly include various sensors for detecting and gathering information about the vehicles' surroundings. These sensors may include ultrasonic sensors for detecting the proximity of a vehicle to objects in the vehicle's surroundings. However, ultrasonic sensors may have limited ability to distinguish one object from another when those objects are relatively close to one another (e.g., distinguishing between an object on a curb and the curb). Therefore, an alternative or supplemental solution to object detection can be desirable.

SUMMARY OF THE DISCLOSURE

Examples of the disclosure are directed to using one or more cameras to detect objects or object heights in proximity to a vehicle using optical flow determinations. In some examples, the vehicle can distinguish between the heights of different objects based on differences in optical flows of those objects that are reflected in the captured images of those objects. Based on these differences in height, the vehicle can distinguish between a curb and an object on the curb, for example. Distinguishing between a curb and an object on the curb can be useful in various situations, including during autonomous driving or parking operations. For example, in the course of performing autonomous parking operations, the vehicle can utilize the curb location to orient itself for parking purposes while ensuring avoidance of the object on the curb.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include ultrasonic sensors for detecting the proximity of the vehicles to objects in the vehicles' surroundings. However, ultrasonic sensors may have limited ability to distinguish one object from another when those objects are relatively close to one another (e.g., distinguishing between an object on a curb and the curb). Examples of the disclosure are directed to using one or more cameras to detect objects or object heights in proximity to a vehicle using optical flow determinations. In some examples, the vehicle can distinguish between the heights of different objects based on differences in optical flows of those objects that are reflected in the captured images of those objects. Based on these differences in height, the vehicle can distinguish between a curb and an object on the curb, for example. Distinguishing between a curb and an object on the curb can be useful in various situations, including during autonomous driving or parking operations. For example, in the course of performing autonomous parking operations, the vehicle can utilize the curb location to orient itself for parking purposes while ensuring avoidance of the object on the curb.

Figure 1:
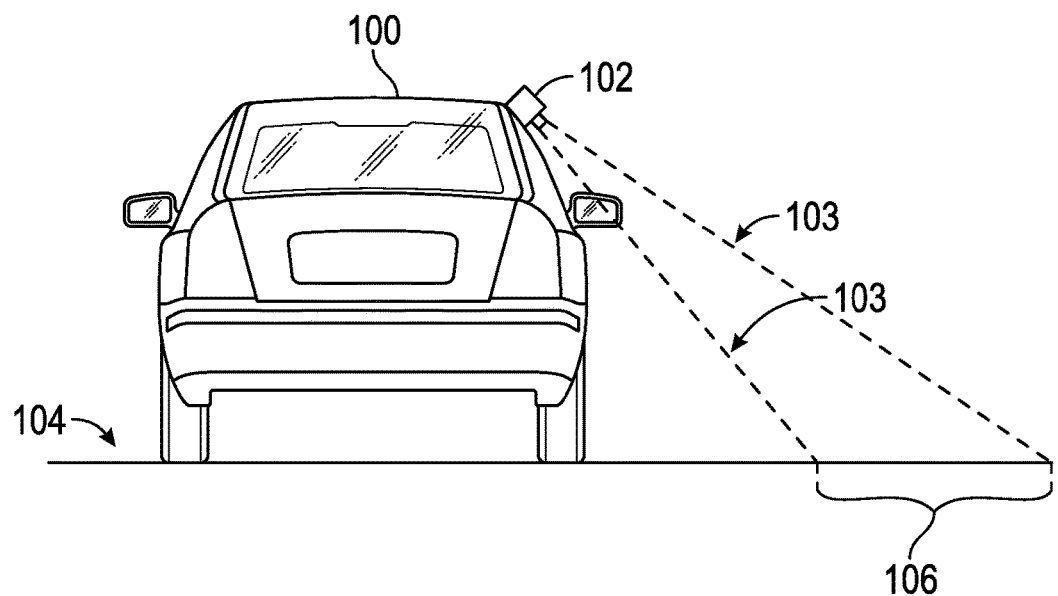
FIG. 1 illustrates an exemplary vehicle having a camera for differentiating between objects having different heights according to examples of the disclosure.

FIG. 1 illustrates exemplary vehicle 100 having camera 102 for differentiating between objects having different heights according to examples of the disclosure. Vehicle 100 can be on road 104, and can have camera 102 mounted to it. Camera 102 can be oriented substantially towards road 104 such that field of view 103 of the camera can include portion 106 of the road next to vehicle 100. In some examples, camera 102 can be mounted above the doors of vehicle 100; for example, near the roof line of the vehicle. Further, in some examples, vehicle 100 can include one or more other sensors (not illustrated) for detecting objects around the vehicle, such as ultrasonic sensors, radar sensors, laser sensors, LIDAR sensors, etc. Although vehicle 100 is illustrated as having one camera 102 for differentiating between objects having different heights, the vehicle can include one or more other cameras on the same side or different sides of the vehicle, as well, in accordance with the examples of the disclosure.

As previously mentioned, vehicle 100 can use camera 102, sometimes in conjunction with other sensors on the vehicle (e.g., ultrasonic sensors), for detecting and differentiating between objects of different heights around the vehicle. This detection can be performed based on differences in optical flow detected in the images captured by camera 102, as will be described below.

Figure 2A:
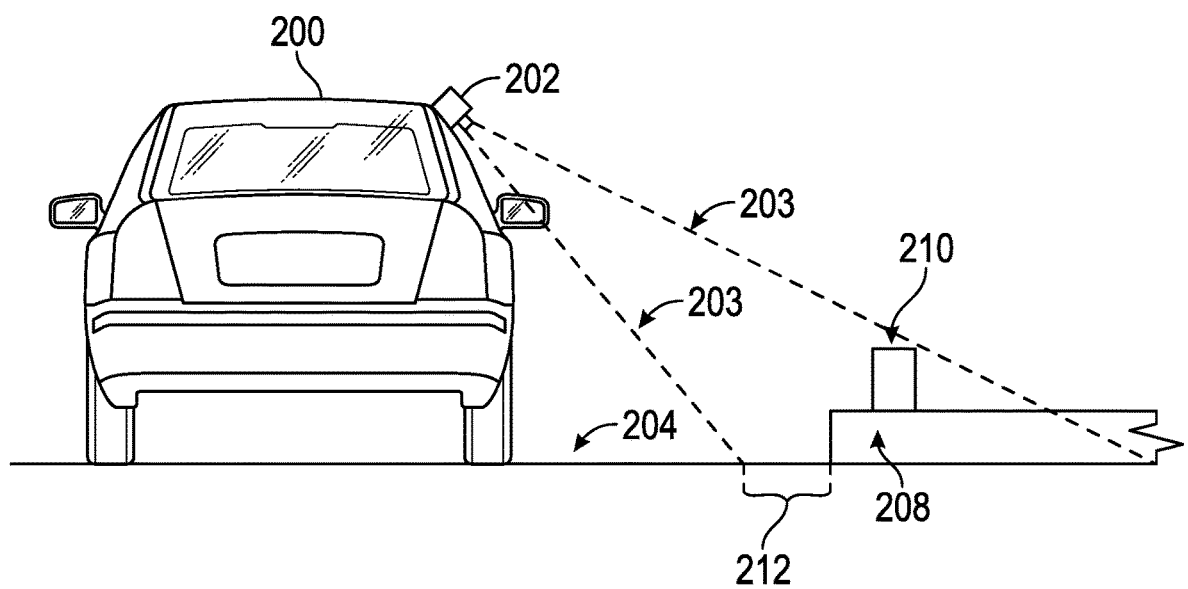
FIG. 2A illustrates an exemplary vehicle with a camera that has a curb and an object within its field of view according to examples of the disclosure.

FIG. 2A illustrates exemplary vehicle 200 with camera 202 that has curb 208 and object 210 within field of view 203 according to examples of the disclosure. Vehicle 200 and camera 202 can correspond to vehicle 100 and camera 102 described with reference to FIG. 1, for example. Vehicle 200 can be near curb 208 and object 210, which can be on top of the curb. Thus, field of view 203 of camera 202 can include curb 208 and object 210, as well as portion 212 of road 204. As previously mentioned, ultrasonic sensors on vehicle 200 may not be able to distinguish between curb 208 and object 210 on top of the curb. As such, vehicle 200 can use camera 202 to differentiate between portion 212 of road 204, curb 208 and object 210, as will be described below.

Figure 2B:
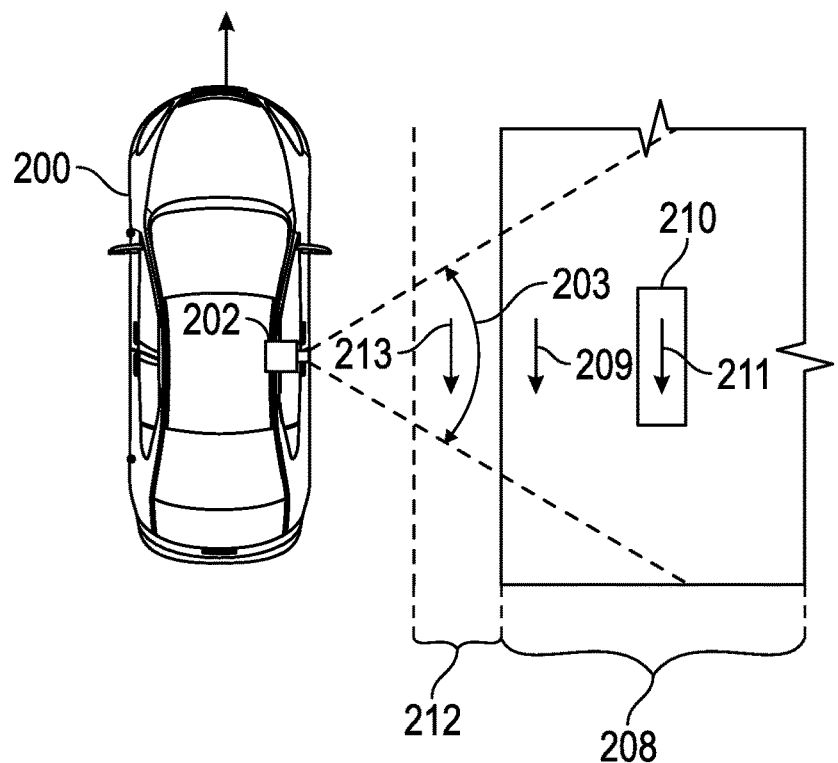
FIG. 2B illustrates an exemplary top view of a vehicle and representative optical flows within a field of view of a camera according to examples of the disclosure.

FIG. 2B illustrates an exemplary top view of vehicle 200 and representative optical flows 209, 211 and 213 within field of view 203 of camera 202 according to examples of the disclosure. In FIG. 2B, vehicle 200 can be moving up on the page. Thus, curb 208, object 210 and portion 212 of the road can be moving down on the page with respect to vehicle 200; camera 202 can capture this movement of the curb, object and portion of the road relative to the vehicle. The movement of curb 208, object 210 and portion 212 of the road with respect to camera 202 can be reflected in optical flows 209, 211 and 213 in the images captured by the camera. Optical flow can refer to the speed with which and/or the direction in which colors, features, objects, edges, etc., move from pixel to pixel in an image captured by camera 202. For example, the pixel-to-pixel movement of colors, features, objects, edges, etc., in portion 212 of the road can be represented as optical flow 213. Similarly, the pixel-to-pixel movement of colors, features, objects, edges, etc., on curb 208 can be represented as optical flow 209. Finally, the pixel-to-pixel movement of colors, features, objects, edges, etc., on object 210 can be represented as optical flow 211. Vehicle 200 can determine these optical flows when camera 202 is moving with respect to curb 208, object 210 and portion 212 of the road. Exemplary techniques for determining optical flow in images are described in Horn, B. K. and Schunck, B. G., "Determining optical flow," 1981 Technical symposium east (pp. 319-331), International Society for Optics and Photonics, the contents of which is hereby incorporated by reference for all purposes.

Distinguishing between objects or surfaces having different heights using optical flow in accordance with the examples of the disclosure will now be described. For a given rate of movement of camera 202 with respect to objects or surfaces on the road, for example, those objects or surfaces that are closer to the camera can have a greater optical flow rate (e.g., can move from pixel to pixel faster) than those objects or surfaces that are farther from the camera. Thus, in the exemplary configuration of vehicle 200 and camera 202 in FIGS. 2A-2B, objects or surfaces that have greater height (e.g., with respect to the road) can have a greater optical flow rate in images captured by camera 202 than objects or surfaces that have less height (e.g., with respect to the road). As such, vehicle 200, using camera 202, can determine that an object or surface with a lower optical flow has less height than an object or surface with a greater optical flow. In this way, vehicle 200 can differentiate between the heights of objects or surfaces surrounding the vehicle.

Further, in some examples, vehicle 200 can utilize the differences in optical flow described above to determine real-world differences in object or surface heights (as opposed to simply determining relative object or surface heights). In particular, because the mounting parameters (e.g., height, position, angle, etc.) of camera 202 on vehicle 200 can be known to the vehicle, the effect that differences in height of objects or surfaces can have on detected optical flows can be calculated and/or calibrated (e.g., at the factory) for use by the vehicle. For example, this correspondence between differences in optical flow to differences in height can be stored in a memory (e.g., a look-up table) in vehicle 200, and can be used by the vehicle in making determinations about the heights of various objects or surfaces, as well as classifying the various objects or surfaces (e.g., as the road, as a curb, as an object on a curb, etc.).

Referring again to FIG. 2B, after determining optical flows 209, 211 and 213, as described above, vehicle 200 can determine that region 212 is a surface furthest away from camera 202, because optical flow 213 can be lower than optical flows 209 and 211, for the reasons given above. Further, optical flow 213 can correspond to (e.g., can be within a predetermined optical flow threshold of) a predetermined optical flow of a surface at a distance from camera 202 at which vehicle 200 would expect the road to be located—using this information, the vehicle can identify region 212 as the road. Vehicle 200 can additionally or alternatively use other image processing techniques for identifying a ground plane in images to identify region 212 as the ground plane, and thus identify region 212 as the road. Vehicle 200 can also determine that curb 208 is closer to camera 202 than region 212, because optical flow 209 associated with the curb can be greater than optical flow 213 associated with region 212. As such, vehicle 200 can determine that there exists a surface or object next to region 212 that has greater height than the road. Further, vehicle 200 can use the difference between optical flow 209 (corresponding to curb 208) and optical flow 213 (corresponding to region 212 of the road) to determine a height difference between the road and the curb, as described above. If that height difference is greater than a threshold height (e.g., the height of a standard curb) or within a predetermined threshold of a threshold height (e.g., the height of a standard curb), vehicle 200 can determined that curb 208 is, indeed, a curb. It is understood that vehicle 200 can similarly make other height-based object identifications, similar to as described above with respect to curb 208, to identify other objects within field of view 203 of camera 202. For example, vehicle 200 can compare object heights detected using camera 202 to a number of predetermined heights of objects (e.g., height of a fire hydrant, height of a mailbox, etc.) to specifically identify, or at least generally classify, objects based on their detected heights.

In addition to the above determinations with respect to curb 208, vehicle 200 can also determine that object 210 is closer to camera 202 than region 212 and curb 208, because optical flow 211 associated with object 210 can be greater than optical flow 209 associated with curb 208 and optical flow 213 associated with region 212. As such, vehicle 200 can determine that there exists a surface or object within curb 208 having a greater height than the road and the curb. Further, vehicle 200 can use the difference between optical flow 211 (corresponding to object 210) and optical flow 209 (corresponding to curb 208) to determine a height difference between object 210 and the curb, and thus determine the existence and/or height of object 210, as described above.

In some examples, in addition or alternatively to using heights and/or height differences to identify surfaces or objects within field of view 203 of camera 202, vehicle 200 can utilize other image processing techniques, such as image recognition, to perform such identification. For example, vehicle 200 can, based on the above-described height determinations, determine that object 210 is on curb 208 and has a certain height, and can use other image processing techniques to determine that object 210 is a child or a fire hydrant having that certain height, for example.

In some examples, vehicle 200 can utilize a reference optical flow in making various ones of the determinations of the disclosure. For example, vehicle 200 can have access to its wheel speed information, and thus information about the speed at which the vehicle is traveling, from one or more sensors used for detecting the wheel speed of the vehicle. In some examples, vehicle speed information can additionally or alternatively be determined from Global Positioning System (GPS) data received from a GPS receiver in vehicle 200. Because the location and other mounting parameters of camera 202 on vehicle 200 can be known, the expected height of the road, and/or correspondingly the expected distance of the road from camera 202, as captured by camera 202, can be known. Therefore, for a given vehicle speed, a reference optical flow corresponding to the road can be known (e.g., calibrated and/or stored in a memory in the vehicle). Vehicle 200 can compare the optical flows detected in the images captured by camera 202 to this reference optical flow to make various determinations about objects or surfaces surrounding the vehicle. For example, an optical flow that is within a predetermined threshold optical flow of the reference optical flow can be determined to correspond to the road. Optical flows that deviate from the reference optical flow can be determined to correspond to height differences, and those height differences can be determined to be relative to the height of the road. For example, optical flow 211 of object 210 can be compared to the reference optical flow, and the height of object 210 with respect to the road can be determined directly from that comparison, rather than by comparing optical flow 211 (corresponding to object 210) to optical flow 213 (corresponding to the road). In this way, optical flow-based height determinations can be simplified. It is understood that other reference optical flows can additionally or alternatively be used in accordance with the examples of the disclosure (e.g., a reference optical flow corresponding to a standard-height curb can be stored in a memory in the vehicle, and can be used as described above).

In addition to determining heights of objects or surfaces around vehicle 200, the vehicle can additionally determine the positions of the objects or surfaces using camera 202. Specifically, because the mounting location and parameters of camera 202 on vehicle 200 can be known, a pixel-to-distance ratio can be calculated and/or calibrated (e.g., stored in a memory in the vehicle) for use by the vehicle in making distance or position determinations. Vehicle 200 can use the pixel-to-distance ratio to convert object distances in images captured by camera 202 to real-world distances. For example, vehicle 200 can determine the number of pixels by which an object is separated from an edge of the images captured by camera 202 (e.g., the edge of the images corresponding to a location closest to the vehicle), and can apply the pixel-to-distance ratio to that number of pixels (e.g., by multiplying the number of pixels with the pixel-to-distance ratio) to determine a real-world distance between the vehicle and the object. Vehicle 200 can similarly apply the pixel-to-distance ratio to other distances in the images captured by camera 202 to determine other real-world distances and/or positions of objects captured by the camera. In this way, vehicle 200 can, for example, determine the distance and/or position of curb 208 with respect to the vehicle for use in a number of operations, such as an automated parking operation.

In some examples, vehicle 200 can utilize camera 202 in conjunction with other sensors on the vehicle, such as ultrasonic sensors, for performing the object and curb detection of the disclosure. In particular, ultrasonic sensors may not be able to determine the height(s) of object(s) in the vehicle's surroundings, but rather may only be able to determine the existence of the object(s). Thus, an ultrasonic sensor, alone, may not be able to differentiate between an object on a curb and the curb itself, for example. As such, vehicle 200 can utilize an ultrasonic sensor to detect the presence and/or location of the curb/object combination, and can utilize camera 202 to detect the heights of the curb and the object, and thus differentiate between the curb and the object. In some examples, vehicle 200 can supplement object presence or location detections made using an ultrasonic sensor (and/or other sensors) with the results of the optical flow-based object location and height determinations made using camera 202. In some examples, vehicle 200 can utilize presence and location results from both an ultrasonic sensor (and/or other sensors) and camera 202 to improve the accuracy of object detection and/or localization; this can be especially true when the relative locations of the camera and the ultrasonic sensor (and/or other sensors) can be known to the vehicle (e.g., known mounting positions and parameters), which can allow for the vehicle to accurately establish correspondence between the camera-based results and the ultrasonic sensor-based results.

Figure 3:
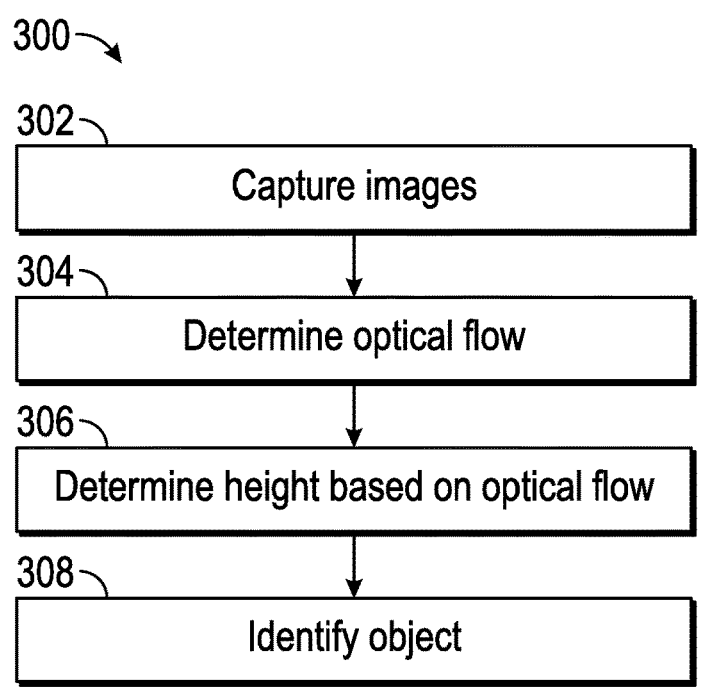
FIG. 3 illustrates an exemplary process for optical flow-based object detection according to examples of the disclosure.

FIG. 3 illustrates exemplary process 300 for optical flow-based object detection according to examples of the disclosure. At 302, one or more images can be received from a camera. For example, one or more images of an area proximate to (e.g., to the side of) the vehicle can be captured by a camera mounted on the vehicle (e.g., as described with reference to FIGS. 1 and 2A-2B). The images can include one or more objects, and can reflect movement of the camera with respect to the one or more objects (e.g., due to movement of the vehicle). The objects can include the road or surface on which the vehicle is moving, a curb, an object on the curb, or any other object. In some examples, the vehicle can determine a ground plane from the captured images that corresponds to the surface on which the vehicle is moving, and can designate this ground plane as the road.

At 304, the vehicle can determine one or more optical flows associated with different objects and/or regions in the one or more images (e.g., as described with reference to FIGS. 2A-2B). Step 304 can include identifying an optical flow as corresponding to the road (or ground plane) in the captured images.

At 306, the vehicle can determine one or more heights of the objects included in the images captured by the camera (e.g., as described with reference to FIGS. 2A-2B). In some examples, step 306 can be skipped, as no height may be explicitly determined by the vehicle; rather, relative optical flow determinations can be made by the vehicle to determine object heights, for example.

At 308, the vehicle can identify the one or more objects in the captured images based on the determined optical flows at 304 and/or the determined heights at 306 (e.g., as described with reference to FIGS. 2A-2B). For example, the vehicle can identify a region in the captured images as the road, because the optical flow for that region can correspond to an expected optical flow for a road. A curb or an object on the curb, or any other object, can similarly be identified based on differences in optical flow. Step 308 can also include utilizing outputs from one or more other sensors (e.g., ultrasonic sensors) for identifying objects and/or positions of objects, as previously described.

Figure 4:
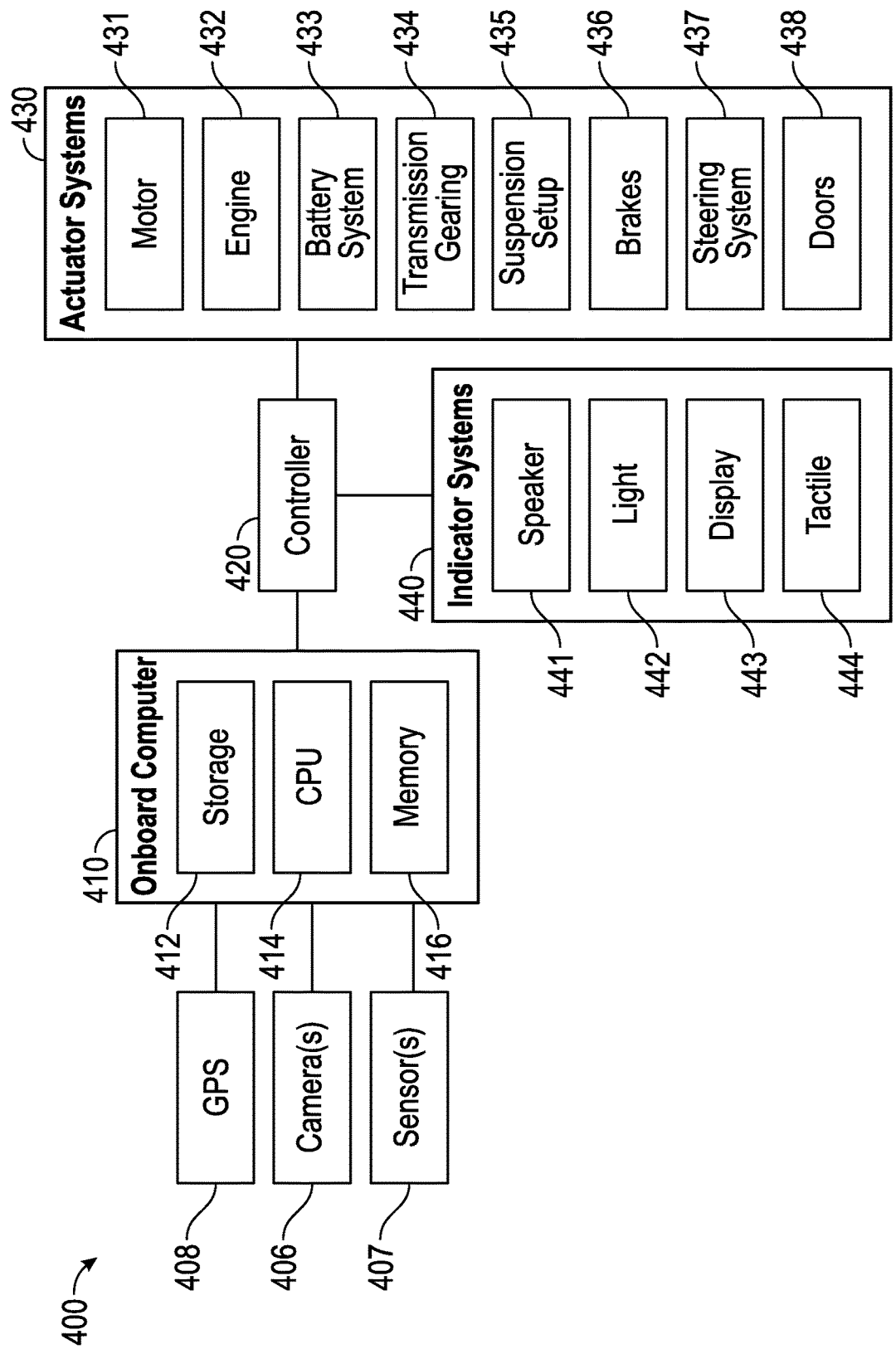
FIG. 4 illustrates an exemplary system block diagram of a vehicle control system according to examples of the disclosure.

FIG. 4 illustrates an exemplary system block diagram of vehicle control system 400 according to examples of the disclosure. Vehicle control system 400 can perform any of the methods described with reference to FIGS. 2A-2B and 3. System 400 can be incorporated into a vehicle, such as a consumer automobile. Other example vehicles that may incorporate the system 400 include, without limitation, airplanes, boats, or industrial automobiles. Vehicle control system 400 can include one or more cameras 406 capable of capturing image data (e.g., video data), as previously described with reference to FIGS. 2A-2B and 3. Vehicle control system 400 can also include one or more other sensors 407 (e.g., radar, ultrasonic, etc.) capable of detecting objects in the vehicle's surroundings, and a Global Positioning System (GPS) receiver 408 capable of determining the location of the vehicle. Vehicle control system 400 can include an on-board computer 410 that is coupled to the cameras 406, sensors 407 and GPS receiver 408, and that is capable of receiving the image data from the cameras and/or outputs from the sensors 407 and the GPS receiver 408. The on-board computer 410 can be capable of identifying objects and/or object heights in the vehicle's surroundings, as described in this disclosure. On-board computer 410 can include storage 412, memory 416, and a processor 414. Processor 414 can perform any of the methods described with reference to FIGS. 2A-2B and 3. Additionally, storage 412 and/or memory 416 can store data and instructions for performing any of the methods described with reference to FIGS. 2A-2B and 3. Storage 412 and/or memory 416 can be any non-transitory computer readable storage medium, such as a solid-state drive or a hard disk drive, among other possibilities. The vehicle control system 400 can also include a controller 420 capable of controlling one or more aspects of vehicle operation, such as performing autonomous parking or driving operations based on the object detection performed by the on-board computer 410.

In some examples, the vehicle control system 400 can be connected to (e.g., via controller 420) one or more actuator systems 430 in the vehicle and one or more indicator systems 440 in the vehicle. The one or more actuator systems 430 can include, but are not limited to, a motor 431 or engine 432, battery system 433, transmission gearing 434, suspension setup 435, brakes 436, steering system 437 and door system 438. The vehicle control system 400 can control, via controller 420, one or more of these actuator systems 430 during vehicle operation; for example, to open or close one or more of the doors of the vehicle using the door actuator system 438, to control the vehicle during autonomous driving or parking operations, based on the object detection performed by on-board computer 410, using the motor 431 or engine 432, battery system 433, transmission gearing 434, suspension setup 435, brakes 436 and/or steering system 437, etc. The one or more indicator systems 440 can include, but are not limited to, one or more speakers 441 in the vehicle (e.g., as part of an entertainment system in the vehicle), one or more lights 442 in the vehicle, one or more displays 443 in the vehicle (e.g., as part of a control or entertainment system in the vehicle) and one or more tactile actuators 444 in the vehicle (e.g., as part of a steering wheel or seat in the vehicle). The vehicle control system 400 can control, via controller 420, one or more of these indicator systems 440 to provide indications to a driver of the vehicle of the existence and/or positions of objects detected in the vehicle's surroundings as described with reference to FIGS. 2A-2B and 3.

Thus, the examples of the disclosure provide various ways to detect and identify objects in a vehicle's surroundings using a camera.

Therefore, according to the above, some examples of the disclosure are directed to a system comprising: one or more processors; and a memory including instructions, which when executed by the one or more processors, cause the one or more processors to perform a method comprising: receiving image data from a first camera mounted on a vehicle, the image data indicative of a motion of the first camera with respect to a first object in an environment of the vehicle; determining a first optical flow of the first object in the image data; and determining a first height of the first object based on the first optical flow. Additionally or alternatively to one or more of the examples disclosed above, in some examples, the image data is further indicative of a motion of the first camera with respect to a second object in the environment of the vehicle, and the method further comprises: determining a second optical flow, different from the first optical flow, of the second object in the image data; and determining a second height of the second object, different from the first height, based on the first optical flow. Additionally or alternatively to one or more of the examples disclosed above, in some examples, the method further comprises: identifying the first object in the image data as a road on which the vehicle is moving based on the first optical flow; and identifying the second object in the image data as a curb based on the second optical flow. Additionally or alternatively to one or more of the examples disclosed above, in some examples, the method further comprises: identifying the first object in the image data as a curb based on the first optical flow; and identifying the second object in the image data as an object on the curb based on the second optical flow. Additionally or alternatively to one or more of the examples disclosed above, in some examples, the method further comprises: identifying, based on the first optical flow, the first object as one of a road on which the vehicle is moving, a curb and an object on the curb. Additionally or alternatively to one or more of the examples disclosed above, in some examples, determining the first height of the first object based on the first optical flow comprises: comparing the first optical flow to a second optical flow of a second object in the image data, the second object having a second height; in accordance with a determination that the first optical flow is less than the second optical flow, determining that the first height of the first object is less than the second height of the second object; and in accordance with a determination that the first optical flow is greater than the second optical flow, determining that the first height of the first object is greater than the second height of the second object. Additionally or alternatively to one or more of the examples disclosed above, in some examples, determining the first height of the first object based on the first optical flow further comprises: determining the first height of the first object based on a difference between the first optical flow and the second optical flow. Additionally or alternatively to one or more of the examples disclosed above, in some examples, determining the first height of the first object based on the first optical flow comprises: comparing the first optical flow to a predetermined optical flow, the predetermined optical flow being independent of the image data and corresponding to a predetermined height; in accordance with a determination that the first optical flow is less than the predetermined optical flow, determining that the first height of the first object is less than the predetermined height; and in accordance with a determination that the first optical flow is greater than the predetermined optical flow, determining that the first height of the first object is greater than the predetermined height. Additionally or alternatively to one or more of the examples disclosed above, in some examples, determining the first height of the first object based on the first optical flow further comprises: determining the first height of the first object based on a difference between the first optical flow and the predetermined optical flow. Additionally or alternatively to one or more of the examples disclosed above, in some examples, the method further comprises identifying the first object by: comparing the first height of the first object to a predetermined height associated with a particular object, the predetermined height being independent of the image data; and in accordance with a determination that the first height is within a predetermined height threshold of the predetermined height, identifying the first object as the particular object. Additionally or alternatively to one or more of the examples disclosed above, in some examples, the method further comprises identifying the first object by: comparing the first optical flow of the first object to a predetermined optical flow associated with a particular object, the predetermined optical flow being independent of the image data; and in accordance with a determination that the first optical flow is within a predetermined optical flow threshold of the predetermined optical flow, identifying the first object as the particular object. Additionally or alternatively to one or more of the examples disclosed above, in some examples, the method further comprises: determining a first location of the first object relative to the vehicle based on the image data. Additionally or alternatively to one or more of the examples disclosed above, in some examples, determining the first location of the first object is based on the image data and data from a second sensor, different from the first camera. Additionally or alternatively to one or more of the examples disclosed above, in some examples, the second sensor comprises one of an ultrasonic sensor, a radar sensor, a laser sensor and a LIDAR sensor. Additionally or alternatively to one or more of the examples disclosed above, in some examples, the method further comprises: performing autonomous driving or parking operations with the vehicle based on the determined first height.

Some examples of the disclosure are directed to a non-transitory computer-readable medium including instructions, which when executed by one or more processors, cause the one or more processors to perform a method comprising: receiving image data from a first camera mounted on a vehicle, the image data indicative of a motion of the first camera with respect to a first object in an environment of the vehicle; determining a first optical flow of the first object in the image data; and determining a first height of the first object based on the first optical flow.

Some examples of the disclosure are directed to a vehicle comprising: a first camera; one or more processors coupled to the first camera; and a memory including instructions, which when executed by the one or more processors, cause the one or more processors to perform a method comprising: receiving image data from the first camera, the image data indicative of a motion of the first camera with respect to a first object in an environment of the vehicle; determining a first optical flow of the first object in the image data; and determining a first height of the first object based on the first optical flow.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An optical processing system of a vehicle comprising:
one or more processors; and
a memory including instructions, which when executed by the one or more processors, cause the one or more processors to perform a method comprising the steps of:
receiving image data from a first camera of the vehicle, the image data indicative of a motion of the first camera with respect to a first object in proximity to the vehicle and indicative of a motion of the first camera with respect to a second object in proximity to the vehicle;
determining a first optical flow of the first object in the image data;
determining a first height of the first object based on the first optical flow;
determining a second optical flow, different from the first optical flow, of the second object in the image data;
determining a second height of the second object, different from the first height, based on the first optical flow;
identifying the first object in the image data as a curb based on the first optical flow; and
identifying the second object in the image data as an object on the curb based on the second optical flow.

2. The system of claim 1, wherein said step of determining the first height of the first object based on the first optical flow further comprises the steps of:
comparing the first optical flow to the second optical flow of the second object in the image data;
in accordance with a determination that the first optical flow is less than the second optical flow, determining that the first height of the first object is less than the second height of the second object; and
in accordance with a determination that the first optical flow is greater than the second optical flow, determining that the first height of the first object is greater than the second height of the second object.

3. The system of claim 2, wherein said step of determining the first height of the first object based on the first optical flow includes
determining the first height of the first object based on a difference between the first optical flow and the second optical flow.

4. The system of claim 1, wherein said step of determining the first height of the first object based on the first optical flow comprises the steps of:
comparing the first optical flow to a predetermined optical flow, the predetermined optical flow being independent of the image data and corresponding to a predetermined height;
in accordance with a determination that the first optical flow is less than the predetermined optical flow, determining that the first height of the first object is less than the predetermined height; and
in accordance with a determination that the first optical flow is greater than the predetermined optical flow, determining that the first height of the first object is greater than the predetermined height.

5. The system of claim 4, wherein said step of determining the first height of the first object based on the first optical flow includes
determining the first height of the first object based on a difference between the first optical flow and the predetermined optical flow.

6. The system of claim 1, wherein the step of identifying the first object comprises the steps of:
comparing the first height of the first object to a predetermined height associated with a particular object, the predetermined height being independent of the image data; and
in accordance with a determination that the first height is within a predetermined height threshold of the predetermined height, identifying the first object as the particular object.

7. The system of claim 1, wherein the step of identifying the first object comprises the steps of:
- comparing the first optical flow of the first object to a predetermined optical flow associated with a particular object, the predetermined optical flow being independent of the image data; and
- in accordance with a determination that the first optical flow is within a predetermined optical flow threshold of the predetermined optical flow, identifying the first object as the particular object.

8. The system of claim 1, said method further comprising the step of determining a first location of the first object relative to the vehicle based on the image data.

9. The system of claim 8, wherein said step of determining the first location of the first object is based on the image data and data from a second sensor, different from the first camera.

10. The system of claim 9, wherein the second sensor comprises one of an ultrasonic sensor, a radar sensor, a laser sensor and a LIDAR sensor.

11. The system of claim 1, said method further comprising the step of performing autonomous driving or parking operations with the vehicle based on the determined first height.

12. A non-transitory computer-readable medium including instructions, which when executed by one or more processors, cause the one or more processors to perform a method comprising:
- receiving image data from a first camera, the image data indicative of a motion of the first camera with respect to a first object in proximity to the first camera and indicative of a motion of the first camera with respect to a second object in proximity to the first camera;
- determining a first optical flow of the first object in the image data; and
- determining a first height of the first object relative to the first camera based on the first optical flow
- determining a second optical flow, different from the first optical flow, of the second object in the image data;
- determining a second height of the second object, different from the first height, based on the first optical flow;
- identifying the first object in the image data as a curb based on the first optical flow; and
- identifying the second object in the image data as an object on the curb based on the second optical flow.

13. A vehicle comprising:
a first camera;
one or more processors coupled to the first camera; and
a memory including instructions, which when executed by the one or more processors, cause the one or more processors to perform a method comprising:
- receiving image data from the first camera, the image data indicative of a motion of the first camera with respect to a first object in an environment of the vehicle and indicative of a motion of the first camera with respect to a second object in the environment of the vehicle;
- determining a first optical flow of the first object in the image data; and
- determining a first height of the first object based on the first optical flow;
- determining a second optical flow, different from the first optical flow, of the second object in the image data;
- determining a second height of the second object, different from the first height, based on the first optical flow;
- identifying the first object in the image data as a curb based on the first optical flow; and
- identifying the second object in the image data as an object on the curb based on the second optical flow.

* * * * *